UNITED STATES PATENT OFFICE.

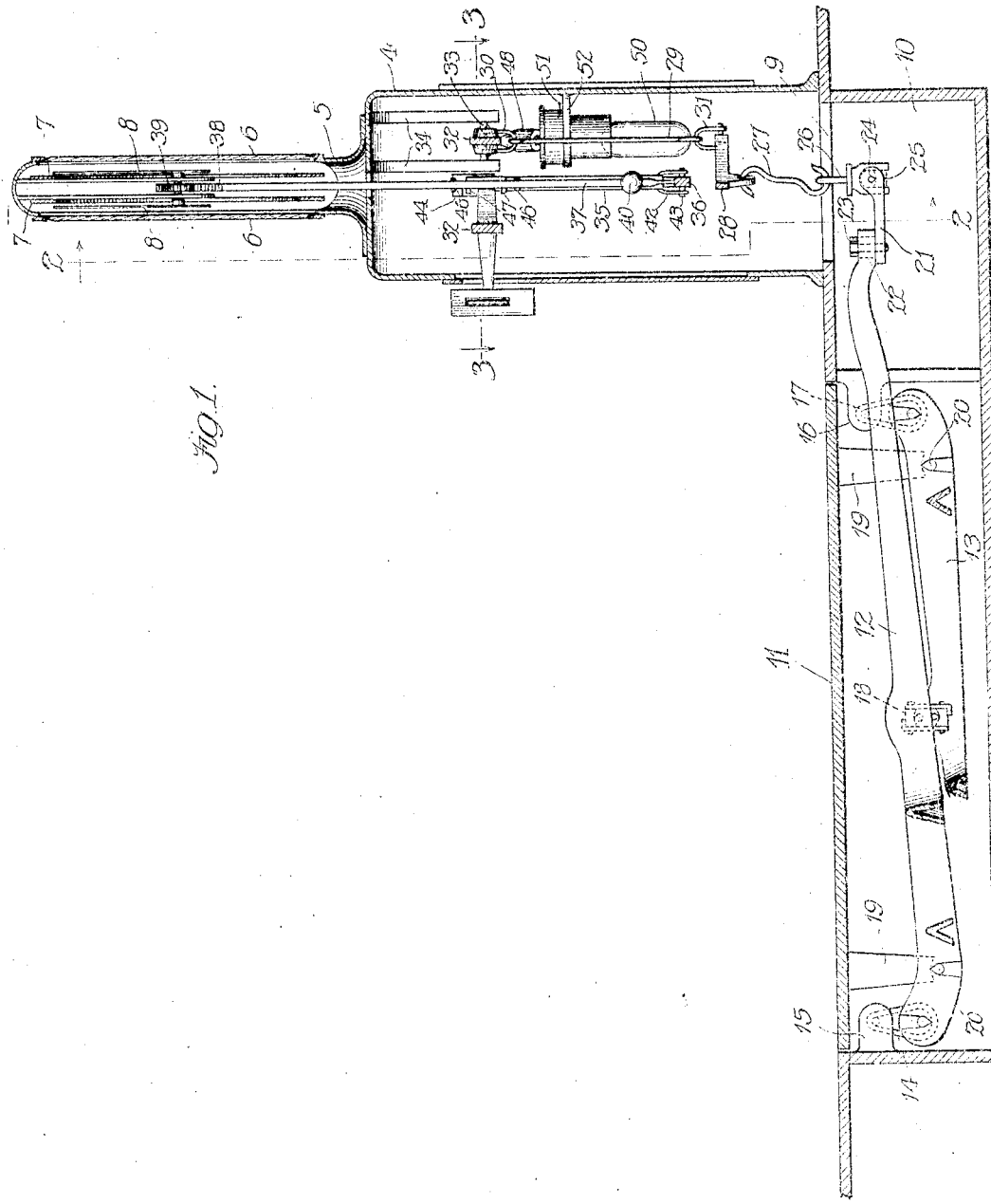

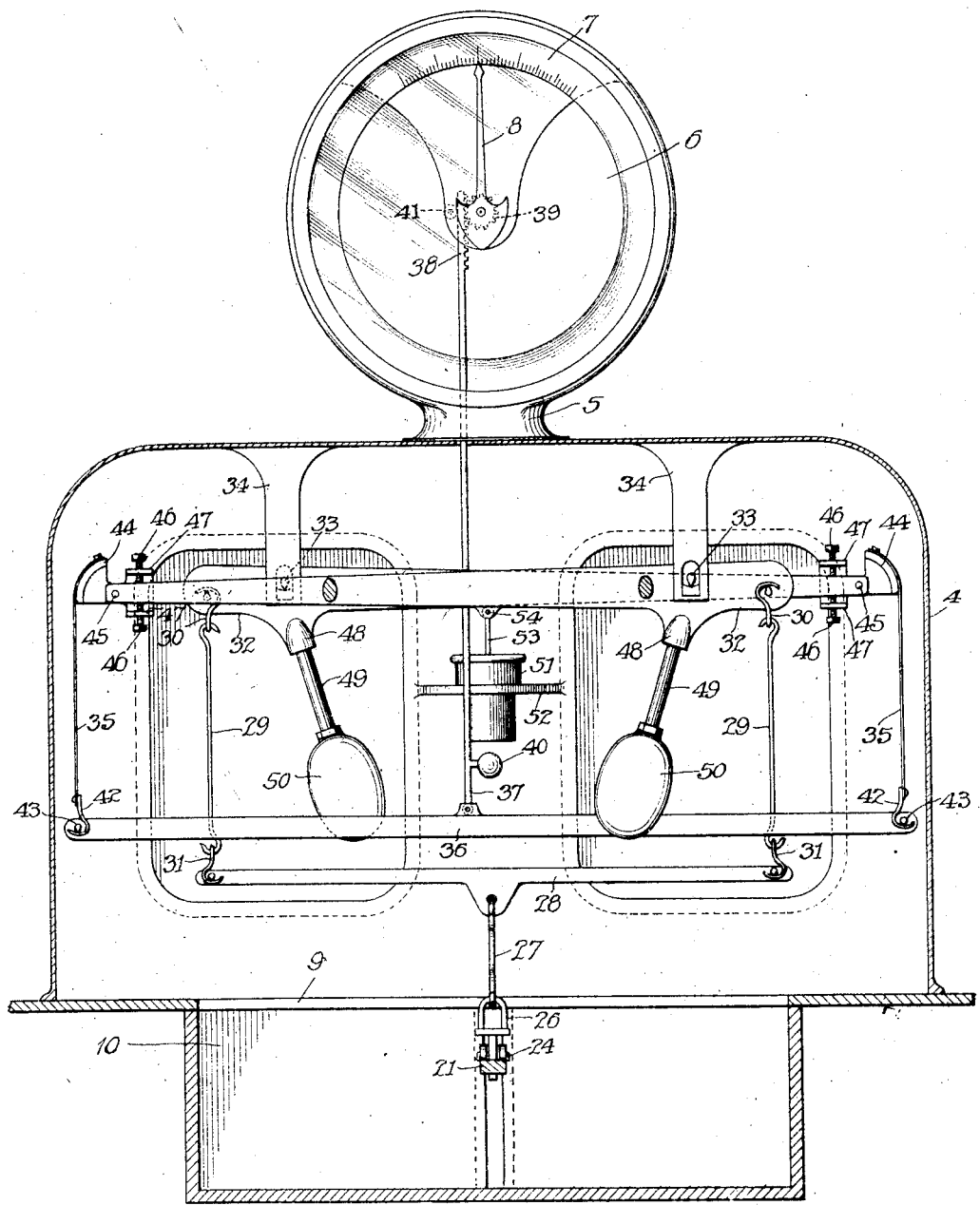

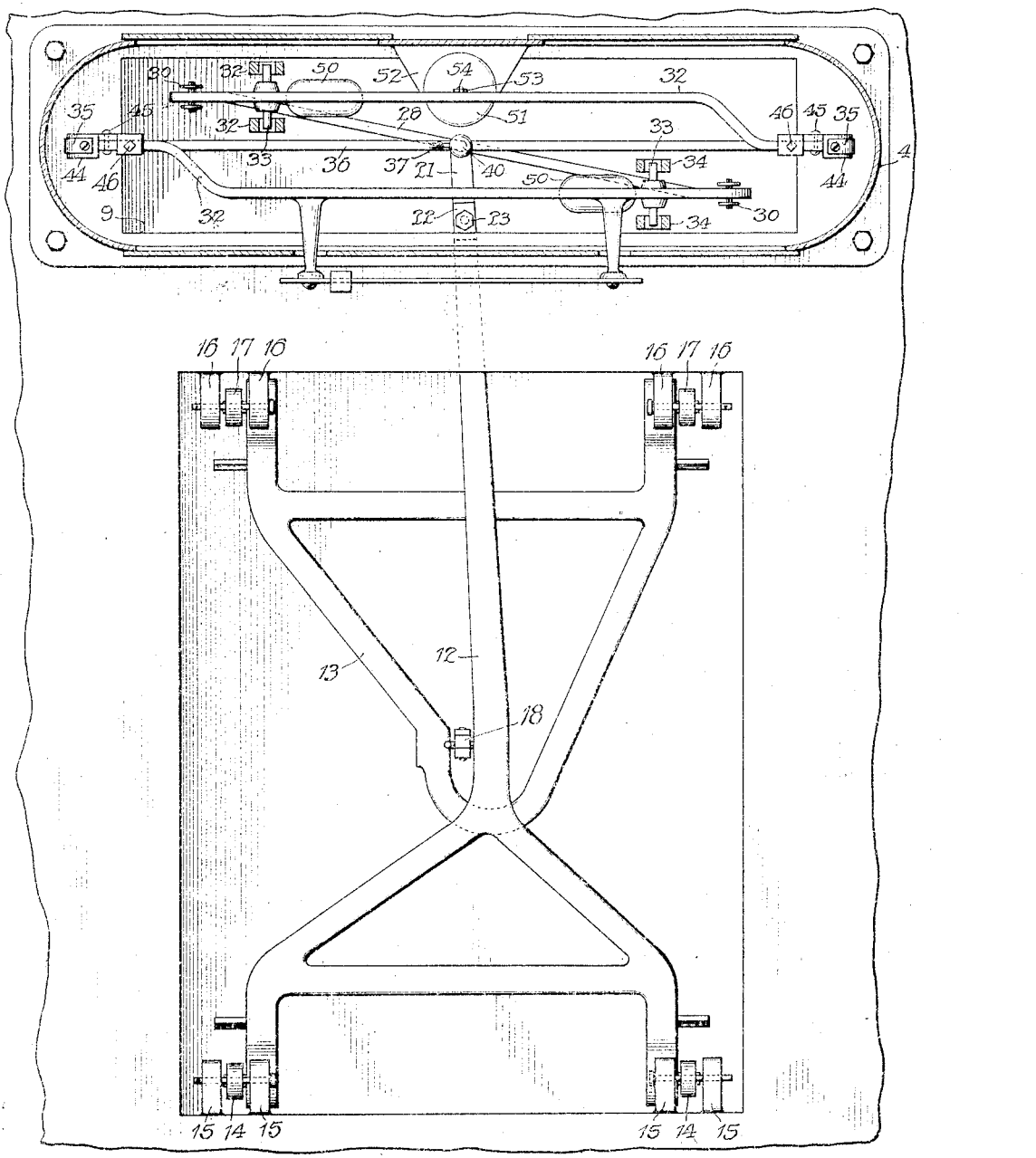

LEWIS CALVIN WETZEL, OF TOLEDO, OHIO, ASSIGNOR, BY MESNE ASSIGNMENTS, TO TOLEDO SCALE COMPANY, OF NEWARK, NEW JERSEY, A CORPORATION OF NEW JERSEY.

WEIGHING-SCALE.

1,213,987.  Specification of Letters Patent.  Patented Jan. 30, 1917.

Application filed March 31, 1913. Serial No. 757,995.

*To all whom it may concern:*

Be it known that I, LEWIS C. WETZEL, a citizen of the United States, residing at Toledo, in the county of Lucas and State of Ohio, have made certain new and useful Improvements in Weighing-Scales, of which the following is a specification.

My invention relates more particularly to weighing scales of the automatic type employing the principle of a pendulum in offsetting the weight of the article or commodity being weighed. In scales of this character commonly employed, in order to secure the necessary degree of accuracy it is essential that they be leveled or adjusted with care.

An object of the present invention is to provide a scale of this type in which the necessity for accurate leveling of the scale is dispensed with without affecting the accuracy of its indications.

In the accompanying drawings and in the following specific description I have illustrated my invention with a floor scale of a particular type, but it is to be understood that it is applicable to other types of scale and the embodiment thereof may depart widely from the specific form disclosed for the purpose of exemplification, the scope of the invention being pointed out in the following claims in which I have endeavored to distinguish it from the prior art so far as known to me without, however, relinquishing or abandoning any portion thereof.

Referring to the drawings, Figure 1 is a vertical longitudinal section through a scale of the type chosen to illustrate my invention; Fig. 2 is a vertical section on a plane at right angles to that of Fig. 1 through the line 2—2 thereof; and Fig. 3 is a plan partly in section on the line 3—3 of Fig. 1.

Each part is identified by the same reference character throughout the several views.

The automatic counterbalance mechanism of my scale is shown as contained in the housing 4, upon which is mounted a circular casing 5, with oppositely disposed side panes 6—6 and containing oppositely faced dials 7—7 and indicator hands 8—8 coöperating therewith. The housing 4 is open at the bottom and communicates through a hole 9 in the floor with a chamber 10 beneath the floor and which contains the system of leverage upon which the platform 11 is mounted. The leverage system shown is of a well known type comprising a pair of levers 12—13 of which the former is suspended by loops 14—14 from lugs 15—15 and connected at its free end to the counterbalancing mechanism within the housing. The other lever 13 is likewise suspended at one end by lugs 16—16 and loops 17—17 and connected at its free end by a loop 18 to the main lever 12. The platform 11 is formed with depending legs 19—19 which rest upon knives 20—20, projecting from the levers 12 and 13. At its rear end the lever 12 is provided with an extension 21 which is adjustable by means of a slot 22 and bolt 23 and the extension carries a knife 24 which rests upon a bearing 25 connected by a loop 26 and hook 27 to an equalizer bar 28. The latter extends transversely of the machine and is connected at its opposite ends by means of links 29 and yokes 30—31, with the short arms of the levers 32—32. These levers are fitted with knives 33—33 by which they are fulcrumed upon brackets 34—34 depending from the top of the housing and are connected at the ends of their longer arms by means of flexible ribbons 35—35 with a second equalizing bar 36, to the center of which is pivoted a rack rod 37, the rack 38 of which meshes with a pinion 39 upon the axis of the indicator ends 8—8. A weight 40 is carried by the rack rod in such a position thereon as to exert its pressure to hold the rack 38 in engagement with the pinion 39; but an anti-friction roller 41 is provided to prevent the rack rod from leaving the pinion. The straps 35—35 carrying hooks 42—42 at their lower ends engage the knives 43—43 upon the equalizer bar, and at their upper ends are secured to and bear upon segments 44—44 which are pivoted to the levers at 45—45 and may be adjusted with relation thereto by means of screws 46—46 passing through ears 47—47 formed upon extensions of the segments. Levers 32—32 are formed with sockets 48—48 which receive the rods 49—49 of the pendulums 50—50. A dashpot 51 is mounted in the bracket 52 upon the housing and the piston rod 53 thereof is connected at 54 with one of the levers, it is immaterial which.

Such being the construction of the scale its operation is readily understood. When the article or commodity to be weighed is placed upon the platform 11, its weight is transferred to the levers 12—13 and from the former through the connections heretofore specified to the equalizing bar 28 and thence to the levers 32—32. The weight upon the levers swings the pendulums from their normal position to an extent which is roughly proportional to the weight of the load and the average movement of the two levers is indicated upon the dial in units of weight through the equalizer bar 36 and rack rod 38 and pinion 39. Any departure from the correct level position laterally of the machine will of course affect the counterbalancing power of each pendulum, but the loss as to one pendulum is counterbalanced by the gain of the other pendulum, equalizing rods 28—36 automatically making the correction.

I claim:

1. In a weighing scale and in combination with the load receiver and weight indicator thereof, weight off-setting means, consisting of a pair of levers arranged side by side, a pair of pendulums each connected to its respective lever, an equalizer bar connected at its ends to the levers respectively and intermediately to the load receiver, and an equalizer bar connected at its ends to the levers respectively and intermediately to the indicator.

2. In a weighing scale and in combination with the load receiver and weight indicator thereof, weight off-setting means consisting of a pair of levers, a pair of pendulums each rigidly connected to its respective lever, an equalizer bar supported at its ends by the levers respectively and intermediately connected to the load receiver, and connections from the levers respectively to the weight indicator.

3. In a weighing scale and in combination with the load receiver and weight indicator thereof, weight off-setting means consisting of a pair of levers, a pair of pendulums each rigidly connected to its respective lever, an equalizer bar supported at its ends by the levers respectively and intermediately connected to the load receiver, and an equalizer bar connected at its ends to the levers respectively and intermediately to the indicator.

4. In a weighing scale and in combination with the load receiver and weight indicator thereof, weight off-setting means consisting of a pair of levers of the first order, a pair of pendulums each connected to its respective lever, an equalizer bar, means connecting said bar at its ends with the respective levers, a load receiver connected to the equalizer bar intermediate its ends, and an equalizer bar supported by the levers at its ends and intermediately connected to the indicator.

5. In a weighing scale and in combination with the load receiver and weight indicator thereof, weight off-setting means consisting of a pair of levers, a pair of pendulums each connected to its respective lever, an equalizer bar connected intermediate its ends to the load receiver, a pair of segments pivoted on the respective levers and adjustable about their pivots, a pair of ribbons connected to and bearing upon the respective segments, and an equalizer bar connected to the levers and indicator.

6. In a weighing scale and in combination with the load receiver and weight indicator thereof, a pair of levers each provided with a pendulum rigid therewith and pivoted intermediate its ends, an equalizer bar, connections from the equalizer bar to the load receiver, means connecting each end of the equalizer bar with an end of each of the levers, a segment mounted upon the other end of each lever, a second equalizer bar, connections between the same and the weight indicator for operating the latter, and straps connecting the segments with a second equalizer bar.

7. In a weighing scale and in combination with the load receiver and weight indicator thereof, an equalizer bar, a pair of levers each having a short and a long arm, and pivoted in parallel and overlapping relation, a pendulum rigid with each lever, an equalizer bar connected to the load receiver, connections from the equalizer bar at its opposite ends to the short ends of the respective levers, segments adjustably mounted upon the long arms of the levers, an equalizer bar, a rack pivoted intermediate the ends of the last named equalizer bar, and connected to the indicator for operating the same, and a ribbon attached to each segment at one end and to the second equalizer bar at the other end.

8. In a weighing scale and in combination with the load receiver and weight indicator thereof, weight-offsetting means comprising a pair of levers arranged side by side, an equalizer bar suspended from said levers at their respectively-opposite ends, a goods receiver connected to said equalizer bar, a second equalizer bar connected at its ends to the respective opposite ends of the levers to those to which the first-named equalizer bar is connected and an operating means connecting the second said equalizer bar with the indicator.

9. In a weighing scale, a casing, a goods receiver and a weight indicator, a pair of levers fulcrumed in the casing respectively near the opposite ends thereof, each said lever having a long and a short arm, the longer of which arms extend in opposite directions, a pendulum connected to each said lever, an equalizer bar connected to the shorter arm of each said lever at its opposite ends and intermediately to the goods receiver, an equalizer bar connected at its opposite ends to the longer arms of the respective levers and intermediate its ends to a weight indicator.

10. In a weighing scale and in combination with the casing, load receiver and weight indicator thereof, a pair of levers pivoted side by side in the casing and having their opposite arms extending in opposite directions and offset each toward the other, segments pivoted to the longer arms of the respective levers, straps depending from said segments, means for adjusting the segments, an equalizer bar supported by the straps, a connection from the equalizer bar to the weight indicator, pendulums connected to the respective levers, an equalizer bar depending at its ends from the shorter arms of the respective levers and connection from the last said equalizer bar to the load receiver.

LEWIS CALVIN WETZEL.

Witnesses:
 H. L. LYON,
 CLARENCE W. FESSENDEN.